United States Patent
Mueller et al.

(10) Patent No.: US 6,254,263 B1
(45) Date of Patent: Jul. 3, 2001

(54) PROTECTED LAMP MOUNTING ASSEMBLY FOR AN OFF ROAD WORK VEHICLE

(75) Inventors: Daniel Joseph Mueller; Kevin Henry Torborg, both of Dubuque, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/433,758

(22) Filed: Nov. 4, 1999

(51) Int. Cl.⁷ ....................................................... F21V 15/01
(52) U.S. Cl. .......................... 362/546; 362/579; 362/481; 362/459
(58) Field of Search ..................................... 362/459, 485, 362/478, 479, 505, 506, 546, 548, 549, 362, 368, 369, 376, 226; 439/34, 36, 385; 296/77.1, 79, 84.1, 87, 96.12; 180/6.7

(56) References Cited

U.S. PATENT DOCUMENTS

| | | | |
|---|---|---|---|
| 2,184,208 | * 12/1939 | Brown et al. | 362/485 |
| 2,781,443 | * 2/1957 | Cargle | 362/485 |
| 2,992,321 | * 7/1961 | Robbins | 362/485 |
| 3,405,898 | * 10/1968 | Ringle | 362/544 |
| 4,513,356 | * 4/1985 | Mikola | 362/226 |
| 5,258,893 | * 11/1993 | Finneyfrock | 362/485 |
| 5,413,188 | 5/1995 | Ui | 180/89 |
| 5,546,286 | * 8/1996 | Branham | 362/485 |
| 5,564,749 | 10/1996 | Branham | 280/830 |

OTHER PUBLICATIONS

Brochure entitled "Tree Farmer, C5D Direct Drive 100 HP Class Specifications", printed in Canada, Jun. 1980.
Brochure entitled "Tree Farmer, C4D 80 HP Class Specifications", Jun. 1980.
Brochure entitled "ROME Model SHM Grapple Shear", printed in U.S.A., Oct. 1972.
Brochure entitled "Valmet 880S", 321 R–15, printed in Finland, date unknown.
Brochure entitled "Caterpillar 966D Log Loader", AEHQ9436, date unknown.
Brochure entitled "National Hydro–Ax", Owatonna, MN, date unknown.
Brochure entitled "ROME Parallelogram Grapple", Seried CG, date unknown.

* cited by examiner

Primary Examiner—Thomas M. Sember
Assistant Examiner—Ismael Negron

(57) ABSTRACT

A protected lamp mounting assembly for an operator's cab roof of a work vehicle having a front edge, two side edges and two outwardly angled edges extending between the front edge and the exterior side edges. Two lamp housings are mounted to the side edges of the roof. The lamp housings are provided with a top plate corresponding to the roof and outwardly angled flanges corresponding to the outwardly angled edges of the roof, so that the roof and top plates and the outwardly extending edges and outwardly angled flanges provide a smooth transition between the roof and the lamp housings. The lamp housings are also provided with a mounting flange and a lamp mounting plate that extends downwardly from the top plate. The lamp housing is secured to the vehicle by the mounting flange. The lamp mounting plate in turn is provided with a lamp aperture having a specified perimeter that is smaller than the outer dimension of the lamp. The lamp is provided with a bulb portion and a rubber lamp deflector. A lamp ring is bolted to the lamp mounting plate and traps the lamp therebetween. The rubber lamp deflector is in contact with the lamp ring. The lamp ring may be provided with an integral longitudinally extending deflector ring. The lamp ring is provided with a rearwardly extending finger for holding an electrical connector in contact with the lamp.

12 Claims, 7 Drawing Sheets

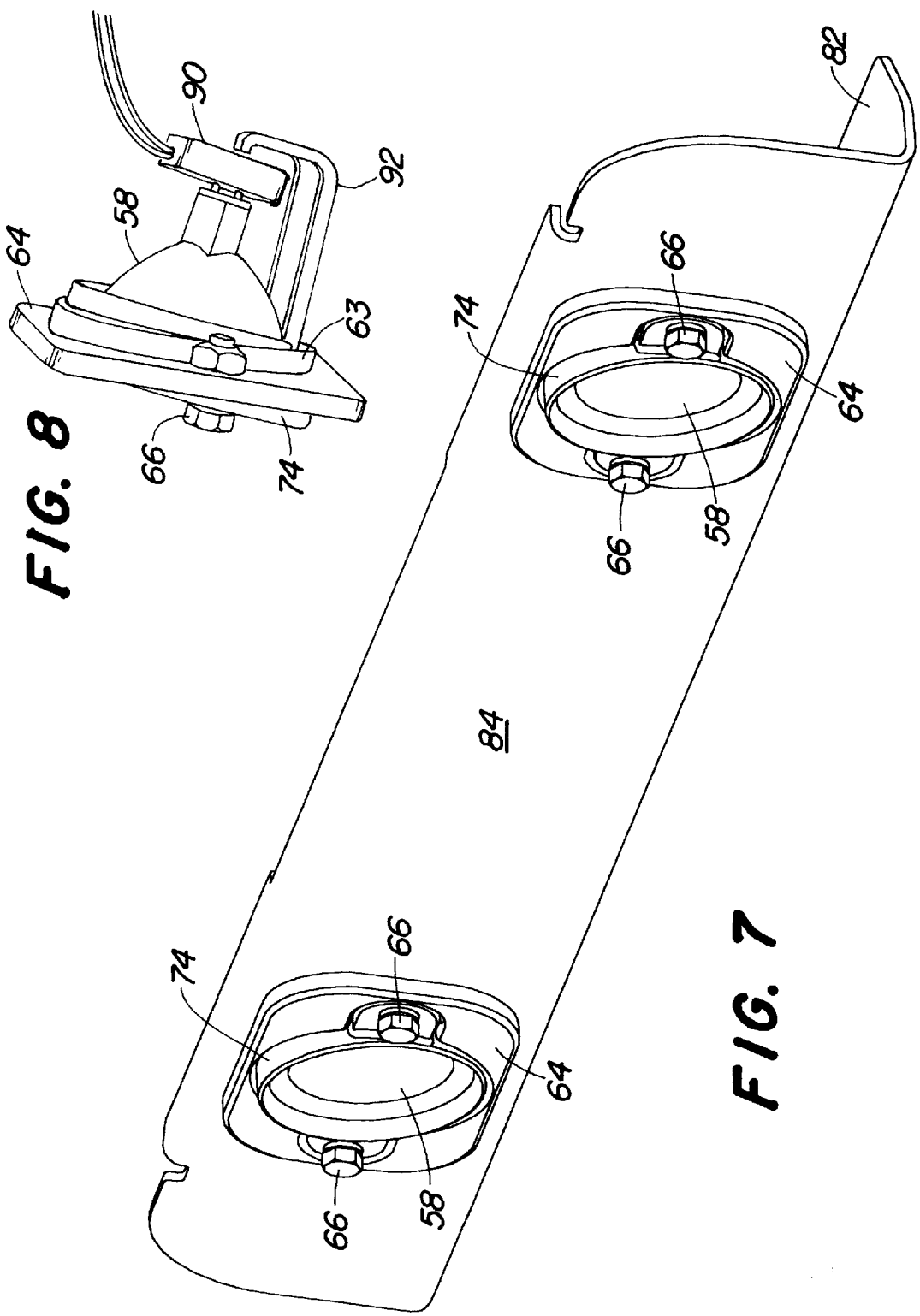

PROTECTED LAMP MOUNTING ASSEMBLY FOR AN OFF ROAD WORK VEHICLE

BACKGROUND OF THE INVENTION

1. Field of the Invention

The invention is directed to a durable mounting assembly used for high intensity halogen lights on an off road work vehicle.

2. Description of the Prior Art

Work vehicles carry a work implement for performing a work operation. To increase productivity of work vehicles they are provided with lighting systems so they can be operated during the hours of darkness. It is important that these lighting systems fully illuminate the work area being operated on by the work implement and also the area in the direction the vehicle might move. In the past, relatively large lamps were used to fully illuminate the work area and direction of travel. With the advent of high intensity halogen lamps, the lamps have become smaller and more directive, specifically focussing on the desired areas to be illuminated.

Off road work vehicles operate in impact prone environments. The vehicles encounter branches and other damaging obstacles that can break the lamps. Of course larger lamps increased the probability of lamps being damaged. Some solutions to the problems of impact prone environments have included mounting the lamps to the roof of the cab so they are protected by the overhang yet still can be directed to the work area and direction of travel. In addition, the lamps may be protected with wire framed brush guards, lenses, or recessed in a housing so as to let the housing deflect the branch. Of course these additional measures incur additional costs and make it more difficult to access the lamp to replace it.

SUMMARY OF THE INVENTION

It is an object of the present invention to provide a lamp mounting structure for an off road work vehicle which provides good protection of the lamp while also allowing the lamp to be easily accessible for replacement.

It is another object of the present invention to provide a lamp housing that corresponds to the roof structure of an off road work vehicle that provides for a smooth transition between the lamp housing and the roof so that branches and other debris are deflected by the lamp housing.

An off road work vehicle is provided with an operators cab having a roof. The roof is provided with a flat top surface that is defined by a front edge, a rear edge, two side edges and two outwardly angled edges extending between the front edge and the side edges. Two lamp housings are mounted to the side edges of the roof. The lamp housings are provided with a top plate corresponding to the roof and outwardly angled flanges corresponding to the outwardly angled edges of the roof, so that the roof and top plates and the outwardly extending edges and outwardly angled flanges provide a smooth transition between the roof and the lamp housings.

The lamp housings are also provided with a mounting flange and a lamp mounting plate that extends downwardly from the top plate. The lamp housing is secured to the vehicle by the mounting flange. The lamp comprises a bulb portion for emitting light and a rubber lamp deflector. The lamp mounting plate is provided with a lamp aperture having a specified perimeter that is smaller than the outer dimension of the lamp. The rubber lamp deflector is used to adjust the angle of inclination of the lamp relative to the lamp mounting plate. The deflector also provides a cushion between the rigid lamp mounting plate and the bulb portion. A lamp ring is bolted to the lamp mounting plate and traps the lamp therebetween. The rubber lamp deflector is in contact with the lamp ring. The lamp ring may be provided with an integral longitudinally extending deflector ring further protecting the lamp. It should be noted that the outer dimension of the bulb portion of the lamp may be smaller than the specified perimeter of the of the lamp aperture but that the outer dimension of the rubber lamp deflector mounted to the bulb would be larger than the specified perimeter.

In the preferred embodiment the lamp would be a high intensity halogen lamp having a circular configuration. The respective lamp aperture would also be circular for receiving the lamp.

BRIEF DESCRIPTION OF THE DRAWINGS

FIG. 7 is a perspective front view of an alternative lamp housing.

FIG. 8 is a perspective side view of the alternative lamp housing of FIG. 7.

DESCRIPTION OF THE PREFERRED EMBODIMENT

Figure 1:
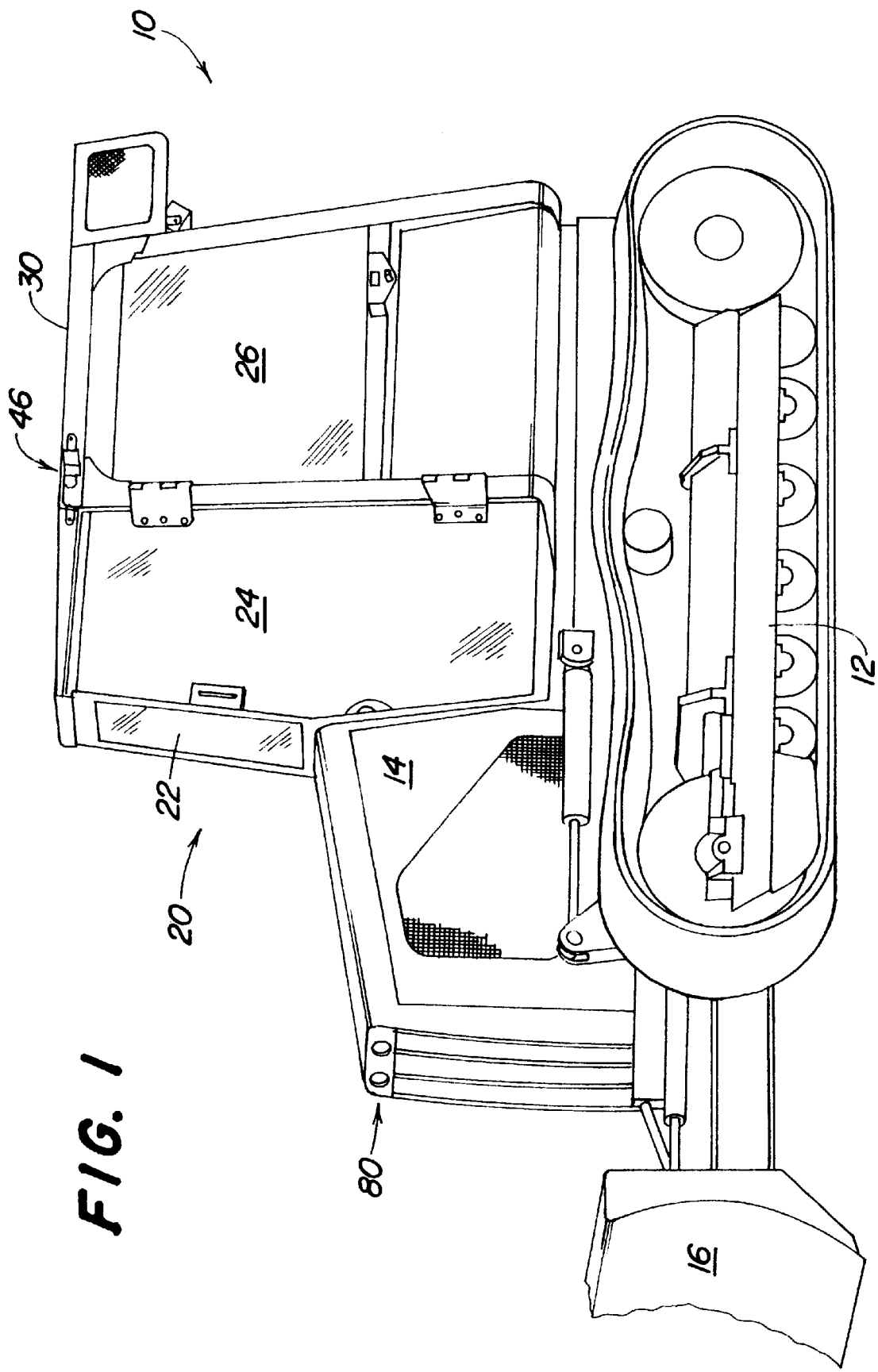
FIG. 1 is a perspective view of an off road work vehicle.
Figure 2:
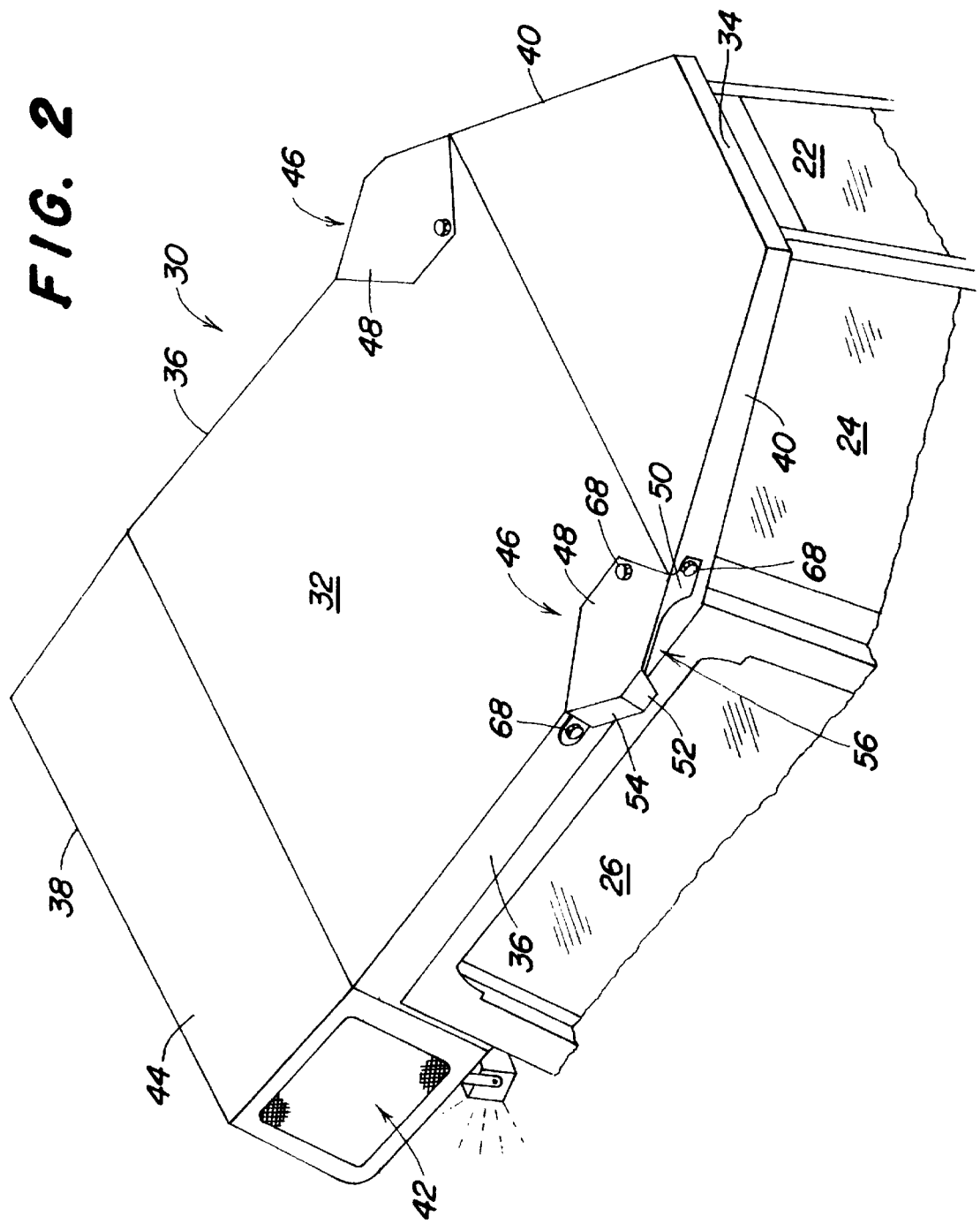
FIG. 2 is a perspective top view of the operators cab of the work vehicle.
Figure 3:
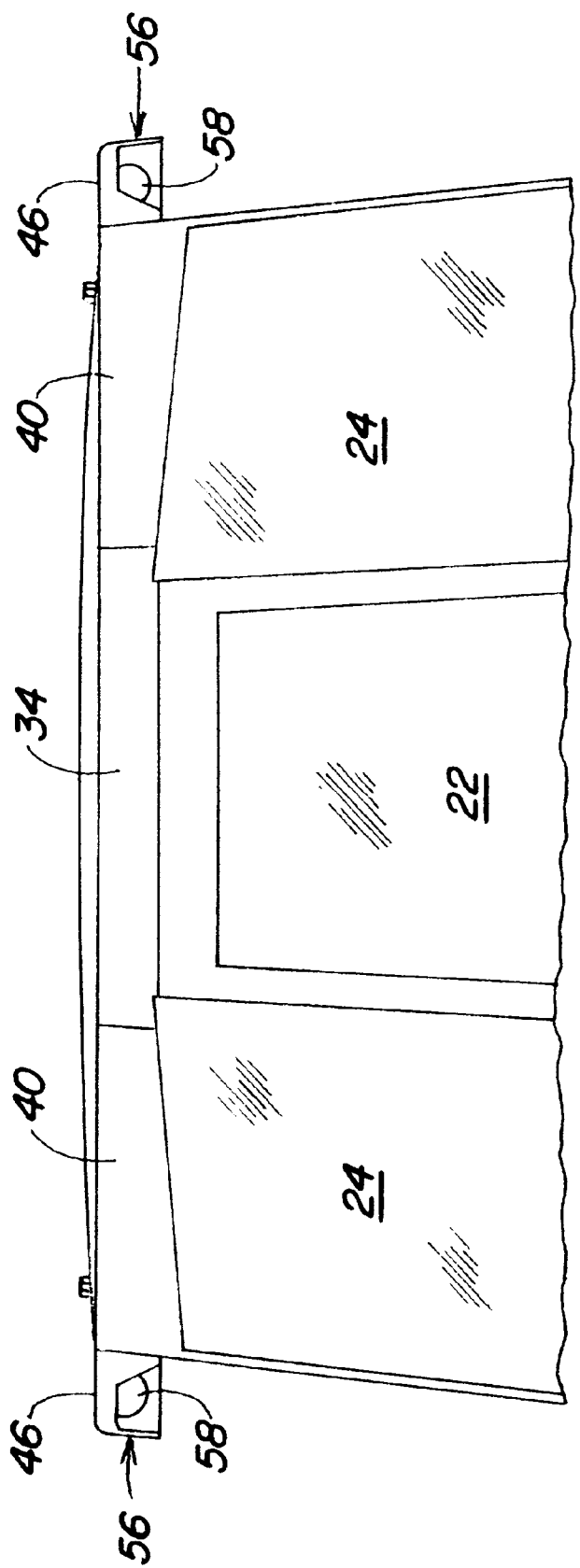
FIG. 3 is a front view of the operators cab of the work vehicle.
Figure 4:
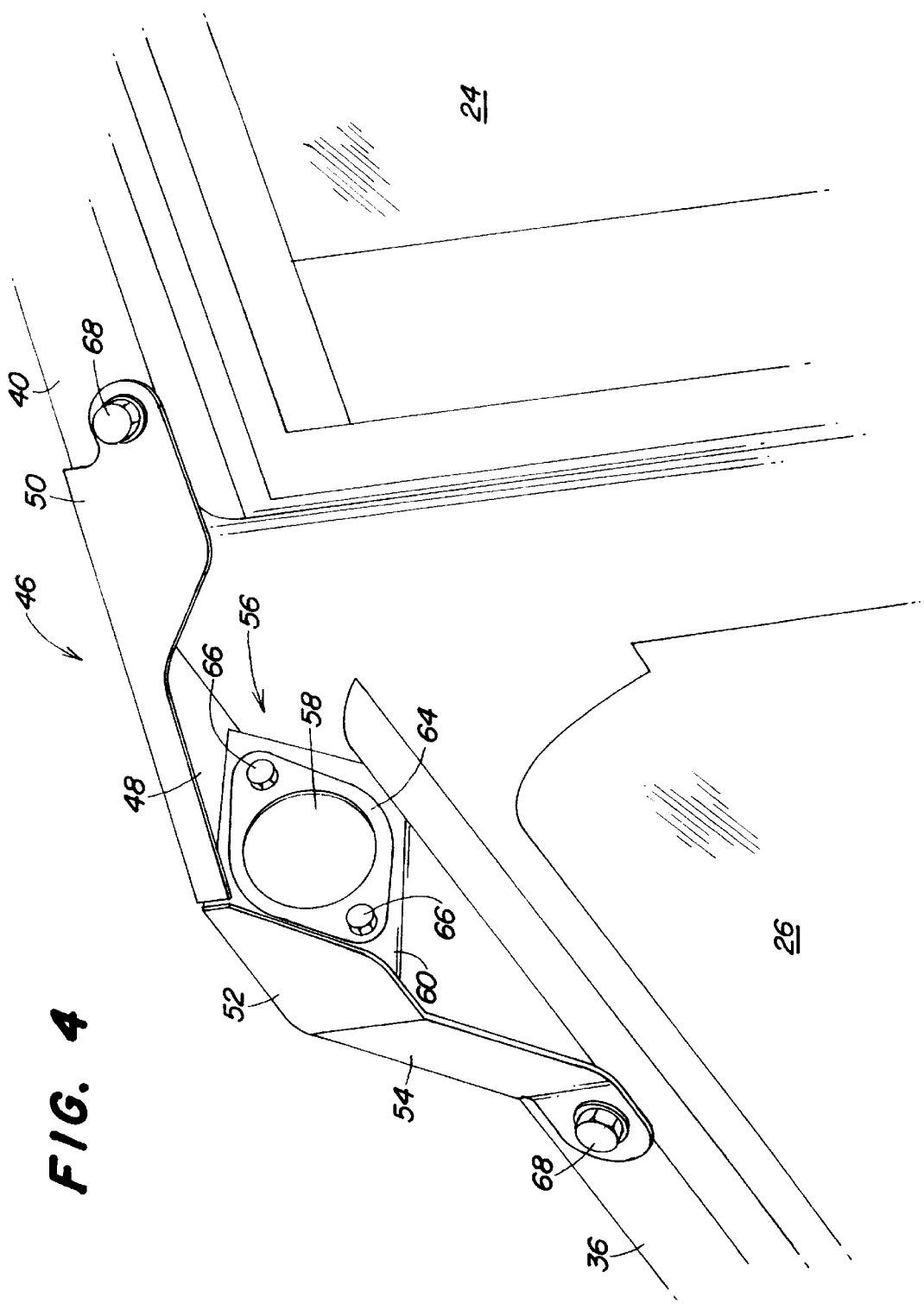
FIG. 4 is a perspective view of the lamp housing mounted to the work vehicle.

The work vehicle 10 in FIG. 1 is a tracked work vehicle having a ground engaging means or track assembly 12 which extends downwardly from the vehicle frame 14. The ground engaging means is used to propel the vehicle across the ground. Although the ground engaging means for the illustrated work vehicle 10 is a track assembly, the vehicle could also be provided with a wheel assembly for propelling it across the ground. The front of the vehicle 10 is provided with a work implement 16, which in the illustrated embodiment is a bulldozer blade. The work implement may comprise a number of different work implements.

The frame 14 of the vehicle 10 is provided with an operators cab 20 having a front windshield 22, angled side doors 24, side walls 26, a rear wall 28 and a roof 30. The cab would normally have a roll over protection system incorporated therein. The roof is provided with a top surface 32 that is defined by front edge 34, side edges 36, rear edge 38 and outwardly angled edges 40. The outwardly extending edges 40 extend between the front edge 34 and the side edges 36. In the preferred embodiment, the heating, ventilating and air conditioning system (HVAC) for the operators cab is housed in a HVAC housing 42 located under the rear overhang 44 of the roof 30.

Lamp housings 46 adjoin the side edges 36 of the roof 30. Each lamp housing 46 is provided with a top plate 48 having an outwardly angled flange 50, a side flange 52 and an inwardly angled flange 54. The outwardly angled flange 50 is provided with a cut away portion 56 through which the light of lamp 58 can project. The lamp 58 is secured to a mounting plate 60 extending downwardly from the top plate 48. The mounting plate 60 is provided with a lamp aperture 62 having a specified perimeter that is smaller than the outside dimension of the lamp 58. In the illustrated embodiment, the lamp 58 and the lamp aperture 62 for receiving the lamp 58 are both circular. The lamp 58 itself is provided with a bulb portion and a rubber lamp deflector 63. The rubber lamp deflector 63 engages the mounting plate 60 and is used to cushion the bulb portion in the mounting plate 60 and also to adjust the angle of inclination of the bulb in the mounting plate. The lamp 58 is trapped in the lamp aperture 62 by lamp ring 64 that is bolted to the mounting flange 60 by bolts 66. The lamp ring 64 contacts the rubber lamp deflector 63. The lamp housing 46 is mounted to the roof 30 by bolts 68. It should be noted that the lamp 58 in the preferred embodiment includes a bulb portion and a rubber lamp deflector 63, however the rubber lamp deflector 63 could be eliminated if cushioning material were mounted on the mounting plate 60 and the lamp ring 64.

The lamp housing 46 illustrated in FIGS. 1–4 and 6 provides a smooth transition with the roof 30 to better deflect branches and other debris. The outwardly angled flange 50 corresponds to the outwardly angled edge 40 of the roof so that branches are deflected by the lamp housing 46. Similarly the top plate 48 of the housing 46 corresponds to the top surface 32 of the roof 30 providing another smooth transition.

Figure 5:
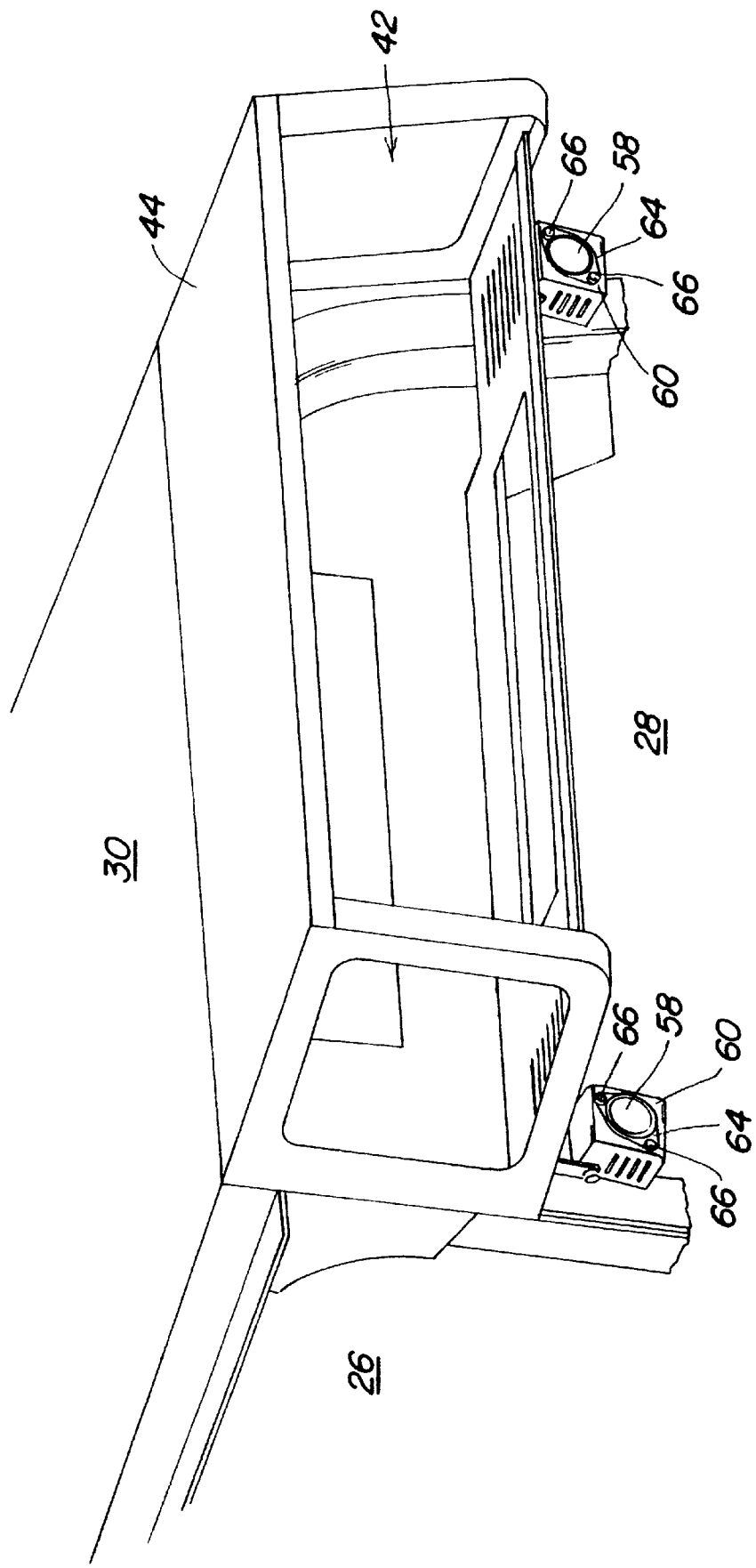
FIG. 5 is a perspective rear view of the operators cab of the work vehicle.
Figure 6:
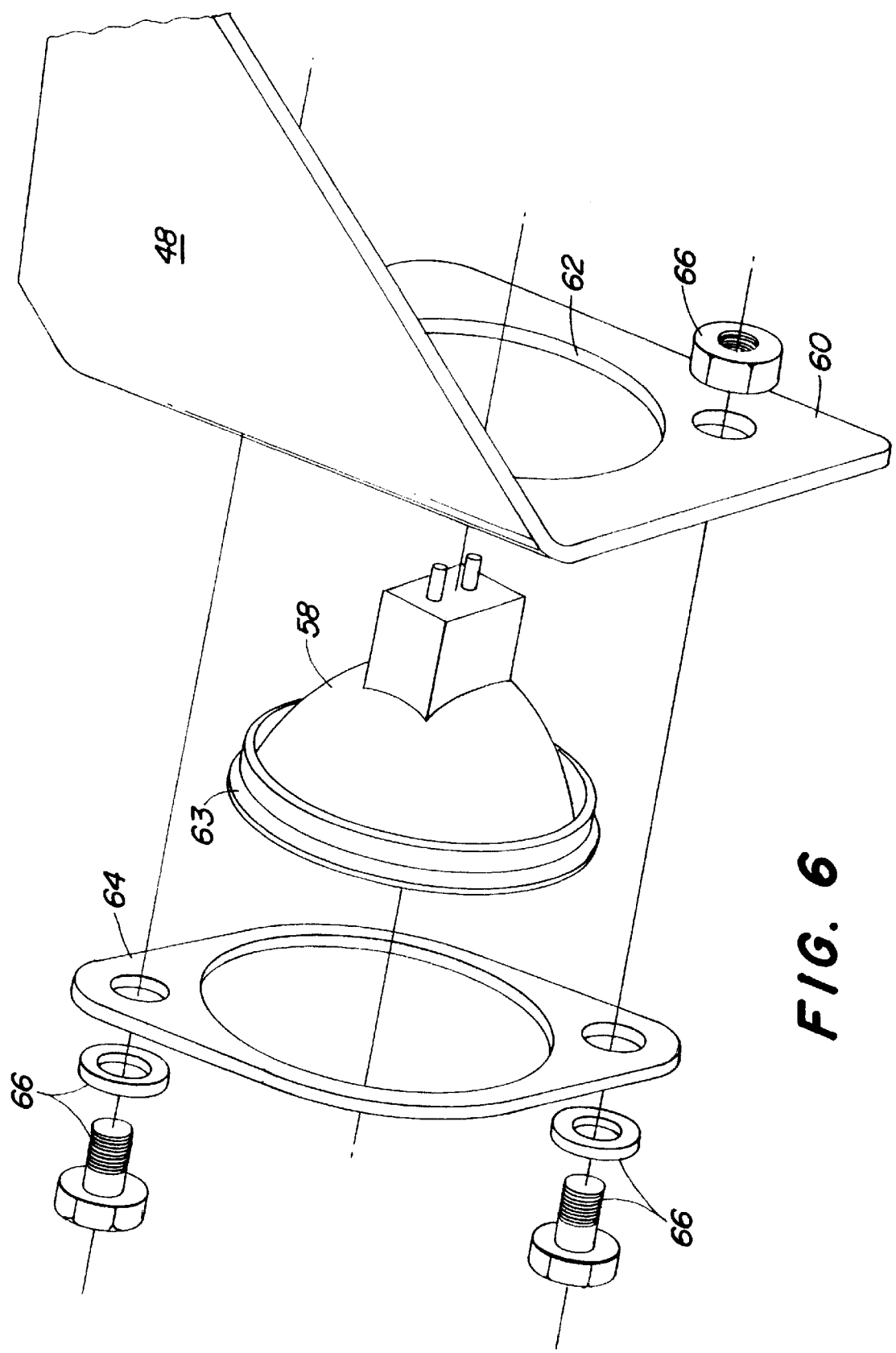
FIG. 6 is an exploded view of the lamp mounting assembly.

FIG. 5 illustrates the rear of the operators cab which is provided with rearwardly illuminating lights 70 that are housed in boxes that are mounted to the underside of the heating, ventilating and air conditioning housing 42. As with the lamp housings 46, lights 70 are provided with a mounting plate 60 having a circular aperture with a specified circumference that is smaller than the outer circumference of the lamp 58. The circular lamp 58 is provided with a rubber lamp deflector that is trapped against the lamp aperture by lamp ring 64. The lamp ring 64 being mounted to the mounting plate by bolts 66. The lamp ring may be provided with an integral longitudinally extending deflector ring 74 which is best illustrated in the embodiment shown in FIGS. 7 and 8.

The lamp mounting assembly shown in FIGS. 7 and 8 corresponds to the front headlights 80 shown in FIG. 1. The mounting assembly comprises a mounting flange 82 and a lamp mounting plate 84. The mounting flange 82 corresponds to the top plate 48 of the lamp housing 46, and the mounting plate 84 corresponds to the lamp mounting plate 60. In addition, the mounting flange 82 and lamp mounting plate 84 may be one in the same. As with the other lamp housings 46 and 70, the mounting plate 84 is provided with two circular apertures for receiving two circular lamps each having a rubber lamp deflector. The lamps 58 are trapped in the lamp apertures by the lamp rings 85 which are bolted to the lamp mounting plate 84 by bolts 66. The lamp rings 85 are provided with an integral longitudinally extending deflector ring 74 for better protecting the lamp 58.

As shown in FIG. 8 the lamp 58 is provided with an electrical connector 90 into which the lamp 58 is plugged. To prevent the connector 90 from becoming separated from the lamp 58 during severe vibrations the lamp ring 64 is provided with a rearwardly extending finger 92 which keeps the connector 90 in contact with the lamp 58. The lamp ring 85 and the finger 92 can be die cast into a single integral part.

It has been found that high intensity halogen lamps are excellent lamps for the above described lamp housings and provide a smaller surface area to contact branches and other debris. The lamp housings described above offer rugged protection for the halogen lamps while also providing servicing ease. The lamps can be removed by simply unbolting two mounting bolts, pulling the lamp outwardly from the mounting plate and disconnecting the lamp from a conventional electrical connector. To insert a new lamp, the new lamp is connected to the electrical connector and inserted into the lamp aperture where it is trapped in place by the lamp ring which is bolted thereon by two bolts.

The invention should not be limited by the above described embodiments, but should be limited solely by the claims that follow.

We claim:

1. A lamp mounting assembly for an off road work vehicle, the off road vehicle being provided with an operator's cab having a roof, the roof being provided with a front edge, a rear edge, two side edges and two outwardly angled edges extending between the exterior front edge and one of the respective side edges, the lamp mounting assembly comprising:

two lamp housings adjoining the side edges of the roof, both lamp housings having a top plate corresponding to the roof and outwardly angled flanges corresponding to the outwardly angled edges of the roof so that the roof and top plates and the outwardly angled edges and outwardly angled flanges provide a smooth transition between the roof and the lamp housings, both housings are provided with a lamp mounting plate extending downwardly from the top plate having a lamp aperture with a specified perimeter which is smaller than the outer dimension of a lamp, the lamp is trapped against the lamp mounting plate by a lamp ring bolted to the lamp mounting plate.

2. A lamp mounting assembly as defined by claim 1 wherein each outwardly angled flange is provided with a cut away portion through which light from the respective lamp can project.

3. A lamp mounting assembly as defined by claim 2 wherein the outer dimension of each lamp is provided with a rubber lamp deflector which directly contacts the lamp mounting plate and the lamp ring.

4. A lamp mounting assembly as defined by claim 3 wherein each lamp housing is provided with an inwardly angled flange located behind the outwardly angled flange and extending to the side edge of the roof.

5. A lamp mounting assembly as defined by claim 4 wherein each lamp housing is provided with a side flange that is parallel to the respective side edge of the roof and which extends between the outwardly angled flange and the inwardly angled flange.

6. A lamp mounting assembly as defined by claim 5 wherein each lamp is circular and the lamp aperture is circular.

7. A lamp mounting assembly as defined by claim 6 wherein each lamp is a high intensity halogen lamp.

8. A lamp mounting assembly for an off road work vehicle, the mounting assembly comprising:

a lamp housing having a mounting flange for securing the lamp housing to the work vehicle, the lamp housing is also provided with a lamp mounting plate having a lamp aperture with a specified perimeter;

a lamp having an outer dimension larger than the specified perimeter is located in the lamp aperture, the lamp having a rubber lamp deflector that contacts the lamp housing;

a lamp ring is bolted to the lamp mounting plate trapping the lamp between the mounting plate and the ring, the ring being in contact with the rubber lamp deflector, wherein the lamp ring is provided with a rearwardly extending finger for holding an electrical connector in contact with the lamp.

9. A lamp mounting system as defined by claim 8 wherein the rearwardly extending finger is integral with the lamp ring.

10. A lamp mounting system as defined by claim 9 wherein the lamp ring is provided with an integral longitudinally extending deflector ring.

11. A lamp mounting system as defined by claim 10 wherein the lamp is circular and the lamp aperture is circular.

12. A lamp mounting system as defined by claim 11 wherein the lamp is a high intensity halogen lamp.

\* \* \* \* \*